Feb. 21, 1928.                                                     1,660,193
F. A. HALLECK
VALVE MECHANISM
Filed Jan. 30, 1922

Inventor:
Frank A. Halleck.
by
Attorney

Patented Feb. 21, 1928.

1,660,193

UNITED STATES PATENT OFFICE.

FRANK A. HALLECK, OF OAK PARK, ILLINOIS, ASSIGNOR TO SULLIVAN MACHINERY COMPANY, A CORPORATION OF MASSACHUSETTS.

VALVE MECHANISM.

Application filed January 30, 1922. Serial No. 532,742.

My invention relates to valve mechanisms, and more particularly to valve mechanisms for compressors or pumps.

An object of my invention is to provide an improved valve mechanism for pumps or compressors. Another object of my invention is to provide an improved combined inlet and discharge valve mechanism for compressors or pumps. A further object of my invention is to provide an improved combined inlet and discharge valve for compressors or pumps which may be readily inserted in operative relation to the cylinder and which may be readily assembled or disassembled. Other objects and advantages of my invention will hereinafter more fully appear.

In the accompanying drawings, I have shown for purposes of illustration one form which my invention may assume in practice.

In these drawings,—

Figure 1:
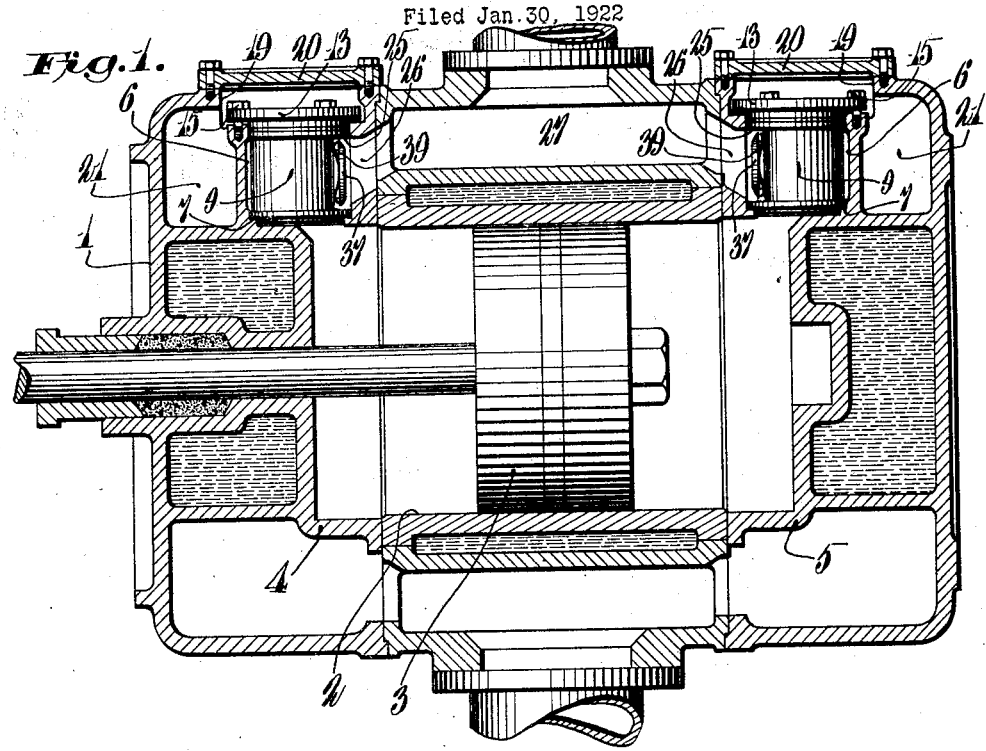
Fig. 1 is a central vertical section through a compressor cylinder provided with the illustrative form of my improved valve mechanism, the latter being shown in elevation.
Figure 2:
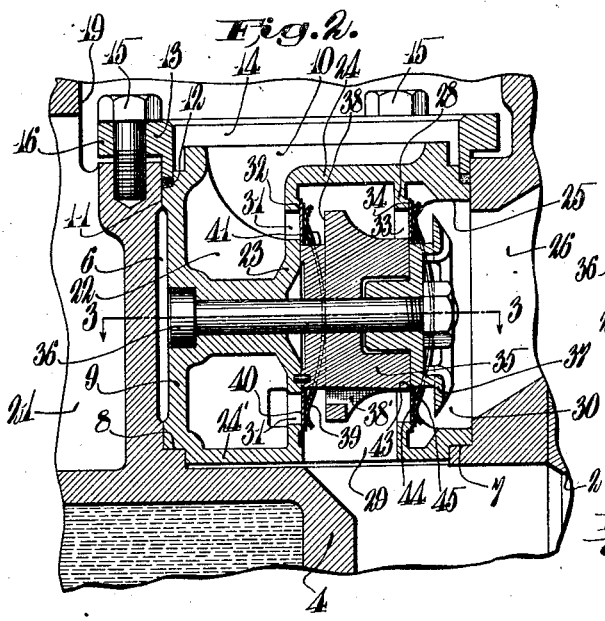
Fig. 2 is a vertical section on a line corresponding to the plane of Fig. 1.
Figure 3:
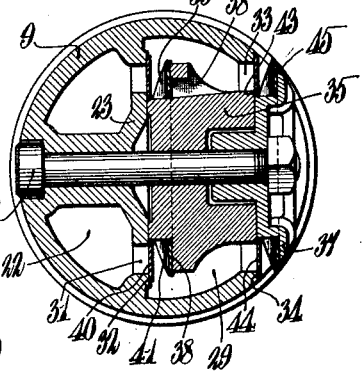
Fig. 3 is a transverse section on the line 3—3 of Fig. 2.

I have shown the embodiment of my improved valve mechanism which I have selected for purposes of illustration in use with a compressor or pump cylinder 1 having a bore 2 within which a piston 3 reciprocates.

The opposite ends of the compressor cylinder are closed by heads 4 and 5, in which heads one or more cage receiving chambers 6, whose axes are disposed herein radially with respect to the cylinder bore, are formed. Within the chambers 6 and adjacent the cylinder ends thereof are annular shoulders 7 upon which corresponding shoulders 8 upon valve cages 9 are adapted to be seated. The valve cages 9 will be noted to be open at their tops as indicated at 10 and to have annular shoulders 11 formed about the peripheries of the upper ends thereof. These shoulders 11 are surmounted by packing material 12, and collars 13 having central openings 14 therethrough, are held by bolts 15 passing through ears 16 on the collars to the head and so hold the cages rigidly and leak proof with respect to the cylinder head. The head is provided with openings 19 closed by cover plates 20 through which the valve mechanisms may be inserted.

It will be noted that the compressor or pump inlet chamber 21 communicates by way of the openings 14 and 10 of the collar and valve cage with a chamber 22 in the valve cage. This chamber is formed by a partition wall 23 which extends for the most part parallel to the axis of the cage, but has portions 24 and 24' at right angles to the axis of the cage which extend respectively across portions of the top and bottom of the cage. The chamber 22 is therefore closed at its bottom by the portion 24' of the partition. The cage is provided with a lateral opening 25 opening into a passage 26 leading to the discharge chamber 27 of the cylinder and a second partition 28 arranged parallel to the partition 23 and extending from the portion 24 of the partition 23 to the lower end of the valve cage. This partition 28 serves to divide the portion of the cage below the wall 24 and to the right of the wall 23 into two further chambers 29 and 30. It will be noted that the partition 23 is provided with a series of annular ports 31 surrounded by valve seating surfaces 32 and that the partition 28 is bored out to form a circular opening 33 therein which is surrounded by a valve seating surface 34.

A member 35, which may be passed through the opening 33, is held to the member 9 by a bolt 36 which cooperates with a guard member 37, which in turn seats upon the member 35. The member 35 lies within the cage member 9 in a position coaxial with the valve seating surfaces 32 and 28 and has an annular portion 38, supported thereon by suitable webs 38', which serves as a guard for a spring 39, herein a transversely flexed annular spring which serves to maintain an annular valve 40, preferably though not necessarily of thin sheet metal, in operative position upon the seating surfaces 32. It will be noted that a guiding surface 41 extends between the annular portion 38 and the seat surface 32. The member 35 is provided, in the same plane with the seat surface 34, with a second concentric surface 43; and a valve member 44 annular in form cooperates with the surfaces 34 and 43. This annular valve member 44 has an annular transversely bowed spring 45 cooperating therewith, which is engaged by the guard member 37 to maintain it under compression. It will be noted that the chamber 29 in the valve cage communicates with the cylinder bore, the chamber 22 with the intake chamber, and the chamber 30 with the discharge valve member.

The mode of operation of this device will be readily apparent. When the piston is making a stroke to the right, the valve 40 will be raised from its seated position upon the surface 32; and fluid will flow in from the chamber 21 through the open top of the valve cage into the chamber 22, through the ports 31 into the chamber 29, and so into the cylinder bore 2. Upon the opposite stroke, the valve 40 will be seated by the spring 39 and the valve 44 will be unseated by the discharging air which will flow out of the cylinder into the chamber 29, then through the annular port 33 past the valve member 44, and finally through port 26 into the discharge chamber 27. It will be noted that the annular valves are each guided and held in proper positions by the valve cage and that the clearance volume is relatively small due to the fact that the chamber 29, which is the only chamber normally in communication with the cylinder, is largely filled by the member 35.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a pump valve mechanism, a stationary element having a chamber formed therein, which chamber communicates through one end with the bore of the pump cylinder, valve mechanism including a one-piece valve cage member disposed in said chamber and insertible through the other end thereof, said valve cage member having partition forming means dividing the interior thereof into a plurality of chambers, valve seats disposed in different planes on said partition forming means, and annular inlet and discharge valves cooperating with said seats.

2. In a pump valve mechanism, a stationary element having a chamber formed therein, which chamber communicates through its end with the bore of the pump cylinder, a valve cage member disposed in said chamber and having longitudinal partitions dividing the interior thereof into a plurality of chambers, valve seats disposed in different longitudinal planes on said partitions, and annular inlet and discharge valves cooperating with said seats.

3. In a pump valve mechanism, a stationary element having a chamber formed therein and adapted to receive by rectilinear movement through one end thereof a valve cage, which chamber communicates through its other end with the bore of the pump cylinder, a valve cage disposed in said chamber and having partition forming means dividing the interior thereof into a plurality of chambers, ports in said partition forming means, and annular inlet and discharge valves controlling said ports and moving in the same direction to open.

4. In a pump having a cylinder and supply and discharge chambers, a stationary element having a chamber formed therein, which chamber communicates through its end with the bore of the pump cylinder, valve mechanism for said cylinder including a one-piece valve cage in said chamber communicating with the bore of the cylinder through one end thereof and with one of said first mentioned chambers through the other end thereof, and having a lateral port communicating with the other of said first mentioned chambers, and inlet and discharge valves in said cage controlling communication between said cylinder and said first mentioned chambers.

5. In a pump having a cylinder and supply and discharge chambers, a stationary element having a chamber formed therein, which chamber communicates through its end with the bore of the pump cylinder, a valve cage in said chamber provided with partition forming means forming the interior thereof into a plurality of chambers one of which communicates through a passage opening through an end wall only of said cage with the bore of the cylinder, another of which opens only through another wall of the cage to communicate with one of the said first mentioned chambers, and a third of which opens only through a port through the opposite end of said cage into the other of said first mentioned chambers, and inlet and discharge valves in said cage controlling communication between said cylinder and said first mentioned chambers.

6. In a pump having a cylinder and supply and discharge chambers, a valve mechanism comprising a valve cage having ports in its opposite ends and in the periphery thereof, said cage communicating with said cylinder through one of said end ports and with said chambers through said other ports, and parallel inlet and discharge valves in said cage controlling communication through said ports between the cylinder and said chambers and movable in the same direction to open.

7. In a pump, a valve mechanism including a cage having a plurality of webs formed therein and dividing the interior thereof into a plurality of chambers, a plurality of concentric valve seating surfaces on one of said webs, a single annular valve seating surface on another thereof, a member constituting a guard for said first mentioned surfaces and provided with a valve seat surface concentric with said second mentioned seating surface, and annular valves cooperating with said surfaces.

8. In a pump having a cylinder, a valve mechanism including a cage movable rectilinearly radially of the cylinder to assembled relation therewith and whose axis is disposed when so assembled radially with respect to the cylinder, and a plurality of valves disposed in parallel planes in said cage, the planes of said valves being parallel to a plane to which the cylinder axis is perpendicular.

9. In a pump, a valve mechanism including a cylindrical cage having valve seating surfaces in said cage disposed parallel to the axis of said cage and having substantially annular flow passages therein and opening through said surfaces, and annular valves cooperating with said passages.

10. A valve mechanism comprising a cage member having a longitudinal axis and adapted to be brought to assembled relation with a compressor cylinder by movement parallel to said axis, said cage member presenting a plurality of valve seating surfaces substantially parallel to said axis, valves cooperating with said surfaces, guard means for said valves, and means for holding said cage member, valves and guard means in an assembled relation necessitating removal of said guard means to permit said valves to be accessible from the exterior of said cage and to allow removal thereof.

11. A valve mechanism comprising a ported cage having a recess opening through a lateral wall thereof, valves in said cage, and separate guard means for each of said valves each removable through said lateral opening.

12. In a valve mechanism, a cylindrical cage comprising a single member having inlet and outlet ports and having valve seating surfaces associated with said ports, inlet and discharge valves for said surfaces adapted to move in the same direction during opening of either of said sets of ports, and valve engaging means detachably carried by said cage and common to said valves.

13. A valve mechanism comprising a cage having openings in each of the ends thereof to allow flow of fluid therethrough, and valve mechanisms for controlling said fluid flow disposed parallel to the longitudinal axis of said cage.

14. A valve mechanism having a cage comprising a single member having end and side openings, and valve means disposed parallel to the longitudinal axis of said cage for controlling flow of fluid through one of said openings in both directions and through the other thereof in one direction.

15. Valve mechanism comprising a cage having openings in both ends and a side thereof, the longitudinal axis of the cage extending through the end openings, and valve means disposed parallel to the longitudinal axis of said cage for controlling flow of fluid therethrough, one of said end openings being adapted to have flow of fluid therethrough in either direction while the other end opening and said side opening are adapted to have fluid flow therethrough in one direction.

In testimony whereof I affix my signature.

FRANK A. HALLECK.